United States Patent [19]
Furukawa et al.

[11] Patent Number: 6,009,057
[45] Date of Patent: Dec. 28, 1999

[54] DISC DRIVE EQUIPPED WITH IDENTIFICATION INDICATION READER PROVIDED IN AN OPTICAL DISC

[75] Inventors: Ken'ichi Furukawa, Tokyo; Takayuki Igarashi, Yamagata, both of Japan

[73] Assignee: Mitsumi Electric Co. Ltd., Japan

[21] Appl. No.: 08/936,988

[22] Filed: Sep. 25, 1997

[30] Foreign Application Priority Data

Sep. 26, 1996 [JP] Japan ..................................... 8-275469

[51] Int. Cl.⁶ ....................................................... G11B 7/00
[52] U.S. Cl. ............................ 369/53; 369/75.1; 369/54; 235/462
[58] Field of Search .................................. 369/52, 54, 58, 369/53, 75.1, 75.2, 195, 199; 235/454, 462

[56] References Cited

U.S. PATENT DOCUMENTS

| | | |
|---|---|---|
| 4,677,604 | 6/1987 | Selby, III et al. . |
| 4,983,815 | 1/1991 | Kumasaka . |
| 5,282,187 | 1/1994 | Lee . |
| 5,382,776 | 1/1995 | Arii et al. . |
| 5,671,202 | 9/1997 | Brownstein et al. ...................... 369/58 |

FOREIGN PATENT DOCUMENTS 7-182659  7/1995  Japan .

*Primary Examiner*—Thang V. Tran
*Attorney, Agent, or Firm*—Brian M. Mattson; Patents & TMS, P.C.

[57] ABSTRACT

A disc drive is provided with an optical pick-up for reading data recorded in a program area of an optical disc; and a photo-interrupter for optically reading out bar information of a bar code which is arranged in an arc shape within at least a part of an annular bar code area provided on the optical disc between the program area and a clamping area of the optical disk so as to be readable from either side of the top and underside surfaces of the optical disk, wherein the photo-interrupter is located on the opposite side of the optical disc relative to the optical pick-up when the optical disc is loaded in the disc drive to read the information of the bar code from that position. Preferably, the photo-interrupter is provided on a clamper support which is provided for supporting a disc clamper for holding the optical disc between the disc clamper and a turntable for rotating the optical disc. This arrangement makes it easy to provide the photo-interrupter for reading the bar code.

16 Claims, 14 Drawing Sheets

DISC DRIVE EQUIPPED WITH IDENTIFICATION INDICATION READER PROVIDED IN AN OPTICAL DISC

BACKGROUND OF THE INVENTION

1. Field of the Invention

The present invention relates to a disc drive for playing back or recording and playing back a disc such as an optical disc, and in particular relates to a disc drive equipped with a device for reading a bar code provided on an optical disc.

2. Description of the Prior Art

FIG. 1 is an exploded perspective view which shows the structure of one example of conventional disc drives for playing back or recording and playing back an optical disc 3.

As shown in FIG. 1, a disc drive 1C is roughly constructed from a main body 2 and a disc tray 5 which moves backwards and forwards in the horizontal direction with respect to the main body 2.

The main body 2 is roughly constructed from a bottom plate 11, a main circuit substrate assembly 12 arranged on the bottom plate 11, a mechanism assembly 13 provided on the main circuit substrate assembly 12 and a casing 14 which covers the mechanism assembly 13.

The casing 14 is provided with a top plate portion 14a. On the underside surface (inner surface) of the top plate portion 14a, a disc clamper 38 is rotatably mounted such that its rotational axis is aligned with that of a turntable 26 described below. The casing 14 is attached to the upper portion of the mechanism assembly 13 by means of screws 17, and the bottom plate 11 is attached to the lower portion of the mechanism assembly 13 by means of screws 17 with the main circuit substrate assembly 12 being interposed therebetween.

Formed in the front plate 14e of the case 14 is an aperture 14f through which the disc tray 5 is passed. A front panel 15 having an aperture 15a corresponding to the aperture 14f is mounted to the front plate 14e via a cushioning frame member 15 formed from a sponge.

The mechanism assembly 13 includes a roughly container-shaped chassis 20 which is provided with a mechanism unit 22 and a loading mechanism 30. The mechanism unit 22 is arranged within a concave portion formed in the bottom portion 20a of the chassis 20, and the loading mechanism 30 is arranged in front of the concave portion 21 of the chassis 20.

The mechanism unit 22 includes a base 23 which is provided with a spindle motor 25 for rotating an optical disc 3, a turntable 26 which is fixed to a rotation axis of the spindle motor 25, an optical pick-up (optical head) 27, an optical pick-up moving mechanism 28 and a photo-interrupter for reading a bar code of the optical disk 3. Further, a rear end portion (on the back side of the main body 2) of the base 23 is supported by an insulator 29 to enable the base 23 to be freely pivotal with respect to the chassis 20.

The loading mechanism 30 is constructed from a loading motor 31 provided at one side of the front portion of the chassis 20, a rotational speed reduction mechanism 32 for transmitting the rotation of the loading motor 31 with a reduced rotational speed, a cam wheel (ascending/descending gear) 33 which is rotated via the rotational speed reduction mechanism 32, and a base ascending/descending member (not shown in the drawing) which is displaced (pivoted) in accordance with the rotation of the cam wheel 33.

The cam wheel 33 includes a lower gear 33a which meshes with a pinion gear of the rotational speed reduction mechanism 32, and an upper gear 33b which meshes with a rack gear (not shown in the drawing) formed on the back surface of the disc tray 5 along the longitudinal direction (in the forward and backward direction) thereof. Further, a circumferential cam groove is formed in the outer circumference of the axle portion between the gears 33a and 33b. This cam groove receives a protruding follower (not shown in the drawing) formed on the base ascending/descending member. Consequently, as the cam wheel is rotated, the follower and the base ascending/descending member are displaced, and this causes the base 23 to pivot; namely, the front portion of the base 23 is pivotally moved up or down between an ascending position (raised position) and a descending position (lowered position).

Further, as stated in the above, the disc clamper 38 is provided on the top plate 14a of the casing 10 in such a manner that the disc clamper 38 is rotatable with respect to the top plate 14. The disc clamper 38 is adapted to attach to the permanent magnet provided in the turntable 26 by the attracting force thereof, whereby the optical disc 3 can be held between the turntable 26 and the disc clamper 38.

The disc tray 5 includes a shallow concave disc supporting portion 5a for supporting the optical disc 3, and as described above the rack gear is formed on the back surface thereof (not shown in the drawing) which meshes with the upper gear 33b of the cam wheel 33. Consequently, as the cam wheel 33 is rotated, the disk tray 5 is moved forward or backward with respect to the chassis 20 between a disc loaded position (playback position) and a disc placing/removing position (eject position).

When the disc drive 1C is not in use, the disc tray 5 is housed within the casing 10 (at the disk loaded position/playback position). In this state, if an eject operation is carried out, the motor 31 is rotated in a prescribed direction, whereby the cam wheel 33 is rotated in a counterclockwise direction via the rotational speed reduction mechanism 32. This rotation of the cam wheel 33 causes the disc tray 5 to move forward (toward the front side of the disc drive) to the disc eject position protruded outside the casing 10 through the apertures 14f, 15a.

In this state, an optical disc 3 is placed on the disc supporting portion 5a of the disc tray 5, and a loading operation is then carried out, whereby the motor 31 is rotated in the opposite direction, and this causes the cam wheel 33 to rotate in the opposite direction via the rotational speed reduction mechanism 32. Consequently, the disc tray 5 is moved toward the rear of the disc drive, through the apertures 14f, 15a, to the disc loaded position. In this way, the optical disc 3 which is placed at a prescribed position on the disc tray 5 is also transported to the disc loaded position of the main body 2.

Then, the center portion (center hub portion) of the turntable 26 is fitted into a center hole 3a of the optical disc 3, and as the center portion of the optical disc is supported in this way, the disc clamper 38 is magnetically stuck to the turntable 26, with the optical disc 3 being held between the turntable 26 and the disc clamper 38. In this state, the spindle motor 25 is operated to rotate the optical disc 3 at a predetermined rotational speed, and then the information recorded on the optical disc 3 is played back or reproduced using the optical pick-up 27.

If an eject operation is carried out while the rotation of the optical disc 3 is stopped, the operations of each mechanism of the disc drive 1C described above are carried out in reverse order and direction, thereby the disc clamper 38 is released and then the optical disc 3 supported on the disc tray 5 is ejected.

In the meantime, there are optical discs which are provided with an identification indication such as a bar code or the like to specify various information. For example, in the case of an optical disc 3 such as a photo CD developed by Kodak, Inc., as shown in FIG. 2, an arc-shaped bar code 3d is provided on an annular bar code area 3c formed between a clamping area 3b and a program area 3e of the optical disc 3. With this bar code 3d, it is possible to specify various information such as the disc manufacturer and the date of manufacturing, thereby enabling to determine the type of disc, the disc format and the like. In order to read the bar code of an optical disc such as the photo CD, a photo-interrupter for reading bar code information must be provided in addition to an optical pick-up for reading data recorded in the program area 3e of the optical disc.

In this connection, FIG. 3 shows an example of a disc drive which includes such a photo-interrupter (Japanese Laid-Open Patent Application HEI 7-182659). As shown in this drawing, in this disc drive a photo-interrupter 9a is mounted on a sensor platform 9 which is provided in the vicinity of a turntable 8. Thus, by means of the photo-interrupter 9a, the bar code of the loaded optical disc is read from the lower side of the optical disc.

In this way, in the disc drives of the prior art, the photo-interrupter 9a is positioned underneath the optical disc, namely, the photo-interrupter 9a is positioned at the side where the optical pick-up and the turntable 8 are provided, and thereby the bar code is read from underneath the loaded optical disc.

However, before optical discs having the bar code such as photo CDs became widespread, disc drives were not equipped with a photo-interrupter, and for this reason the design of such disc drives did not take into consideration the provision of a photo-interrupter mounting space in the periphery of the turntable. As a result, in order to make it possible to reproduce bar coded optical discs such as photo CDs, a photo-interrupter mounting space must be provided in the disc drive.

In this regard, a position where the photo-interrupter is to be mounted is determined by the fixed positional relationship between the mounting position of the photo-interrupter and the bar code affixed to the optical disc. However, around such a position, various components such as a spindle motor and an optical pick-up moving mechanism have been already provided, so that this greatly limits the places where the photo-interrupter can be mounted. Consequently, there is very little freedom of design, and therefore this makes it difficult to manufacture disc drives adapted to photo CDs and the like based on the design of existing disc drives.

SUMMARY OF THE INVENTION

The present invention has been made in view of the problem in the conventional disc drives, and therefore an object of the present invention is to provide a disc drive in which a bar code reading means such as a photo-interrupter can be easily mounted.

In order to achieve the above object, a disc drive according to the present invention comprises an optical pick-up for reading data recorded in a program area of an optical disc; and identification indication reading means for reading out information of identification indication provided on at least a part of an annular identification indication area provided on the optical disc between a clamping area of the optical disc and the program area thereof, wherein the identification indication reading means is provided on the opposite side of the optical disc relative to the optical pick-up when the optical disc is loaded in the disc drive. The optical disc has a top surface and an underside surface, and the identification indication is provided on the optical disc so as to be optically readable from either side of the top and underside surfaces thereof.

According to the invention described above, since the identification indication reading means (such as a photo-interrupter) is provided on the opposite side of the optical disc relative to the optical pick-up, that is provided on the upper side of the optical disc, there is no component which limits a mounting position of the identification indication reading means when it is to be mounted. Therefore, it is not necessary to pay any consideration to the positions of an optical pick-up, a spindle motor and a turntable and the like when the identification indication reading means is to be mounted. As a result, the identification indication reading means can be easily mounted without being limited by the components or the structure around a position to which the identification indication reading means is to be mounted.

Further, since the identification indication reading means is provided on the opposite side of the optical disc relative to the optical pick-up, it is not necessary to change the design of the locations of the existing components such as the optical pick-up, the spindle motor and the turntable and the like even when the identification indication reading means is newly and additionally provided to the existing disc drives.

Preferably, the identification indication is comprised of transparent portions and light-reflecting portions, and more preferably it is formed from a bar code. Preferably, the bar code is arranged in an arc shape and extends over a prescribed angle within at least a part of the identification indication area.

Preferably, the identification indication reading means is constructed from a photo-interrupter, and it is provided at a position aligned with the identification indication area of the optical disc when the optical disc is loaded in the disc drive.

Preferably, the disc drive is provided with a turntable, a disc clamper for holding the optical disc between the disc clamper and the turntable, and a support means for supporting the disc clamper, wherein the identification indication reading means is provided on the support means. According to this construction, the identification indication reading means can be newly and additionally provided to the existing disc drives easily.

Alternatively, the disc drive is provided with a casing which includes a top plate having an underside surface for covering at least the upper portion of the disc drive, and the identification indication reading means can be provided on the underside surface of the top plate of the casing.

Other objects, structures and advantages of the present invention will be more apparent when the following description of the preferred embodiments are considered taken in conjunction with the appended drawings.

DETAILED DESCRIPTION OF THE PREFERRED EMBODIMENTS

Figure 2:
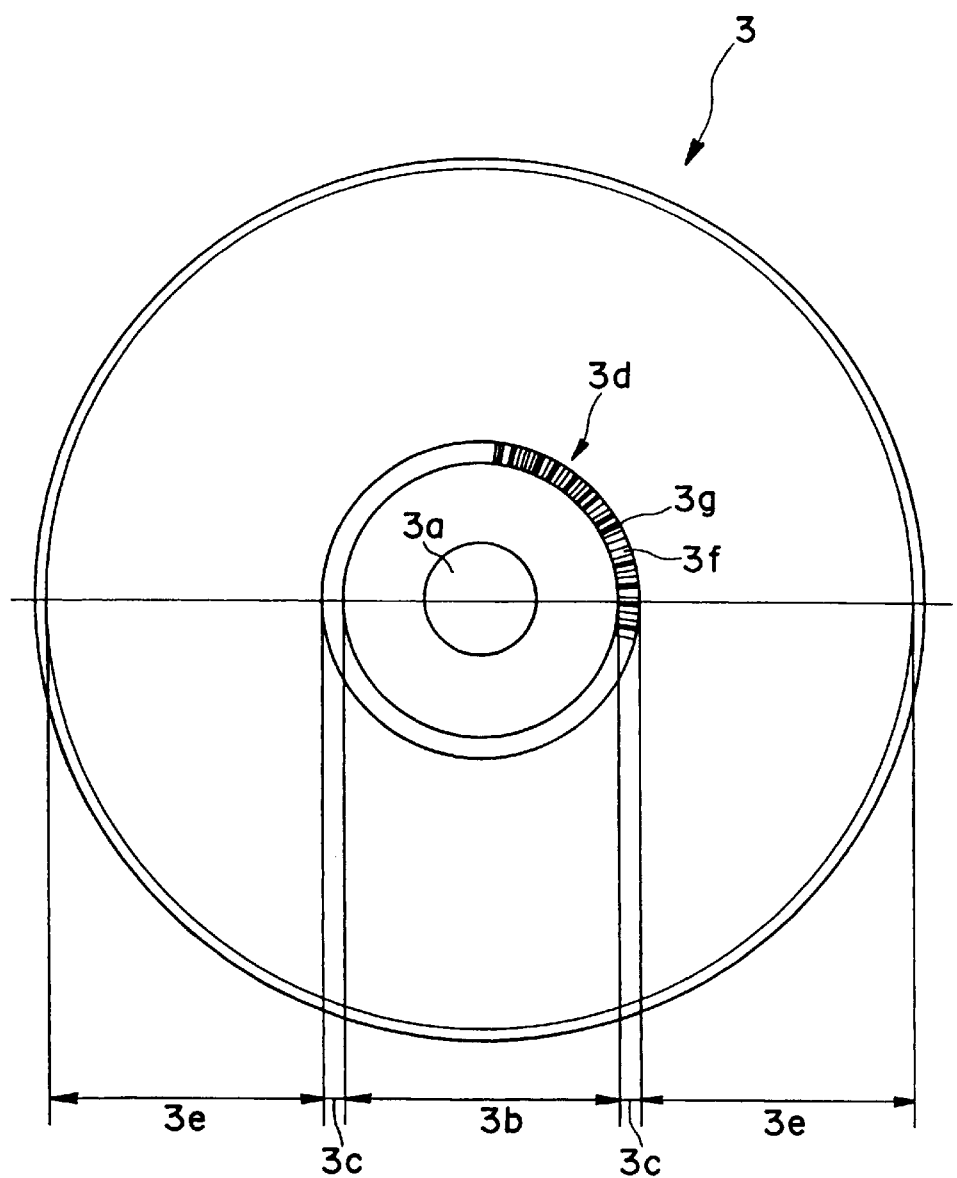
FIG. 2 is a planar view of an optical disc provided with a bar code.
Figure 3:
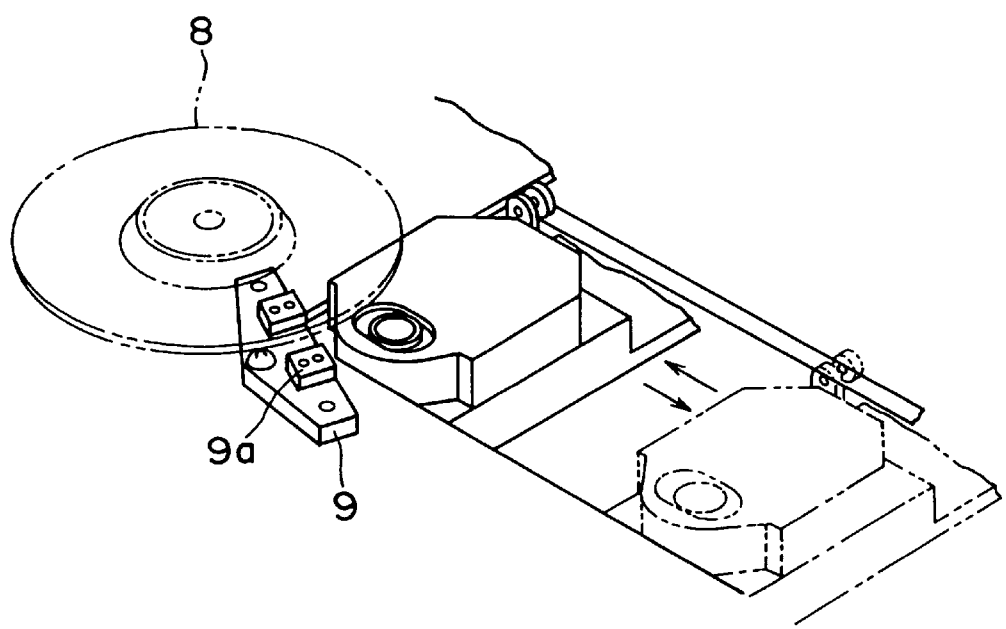
FIG. 3 is a perspective view which shows a mounting position of a photo-interrupter of a conventional disc drive.

First, with reference to the drawings, a photo CD will be described as an example optical disc which can be used in the disc drive of the present invention. In this regard, FIG. 2 is a planar view showing a photo CD. A photo CD is a recordable type compact disc in which image data in the form of electronic data is recorded. The image data is obtained by reading a photographic film with a film scanner to produce the electronic data.

As shown in FIG. 2, the photo CD 3 has a circular shaped central hole 3a formed in the center portion of the photo CD 3 and includes a clamping area 3b provided around the central hole 3a, a bar code area (identification indication area) 3c provided around the clamping area 3b, and a program area 3e provided around the bar code area 3c.

In particular, the central hole 3a of the photo CD is adapted to fit onto a center hub 46a formed in the central portion of a turntable 46 described hereinbelow. Further, when a disc clamper 80 (described below) is magnetically attracted to the turntable 46, the clamping area 3b of the photo CD 3 is held between the disc clamper 80 and the turntable 46, whereby the photo CD 3 is supported so as to rotate together with the turntable 46.

The bar code area 3c is an annular area provided outside the clamping area 3b and inside the program area 3e, and a bar code 3d is provided in a portion of the bar code area 3c in an arc-shaped manner which extends over a prescribed angle. The provision of the bar code 3d makes is possible to specify the type of disc as well as other information such as the disc manufacturer and place and date of manufacture.

The bar code 3d is constructed from a plurality of bars 3f made up of thick and thin lines and a plurality of spaces 3g. In the case of a photo CD, the bars 3f are transparent so as to allow light to pass therethrough. On the other hand, the spaces 3g are colored gold so as to reflect light. Further, the remaining portion of the bar code area 3c which is not provided with the bar code 3d is colored in the same manner as the spaces 3g. Accordingly, it is possible to optically read out the bar code 3d from either above or below the disc. In actuality, when the bar code 3d is to be read out, a sensor (bar code reader) such as a photo-interrupter or the like is used. In this connection, for better understanding the bar portions are shown as black lines in the drawings.

The program are 3e is the area into which the above-described image data is recorded. The data which is recorded in the program area 3e is read out from the underside of the disc by means of an optical pick-up (described below) which is capable of moving in the radial direction of the disc.

A detailed description of the preferred embodiments of a disc drive according the present invention will now be given below with reference to the appended drawings. In this connection, it is to be noted that the same reference numbers will be used for the parts or components of the present invention that are the same or similar to the parts or components of the prior art disc drive described above.

Figure 1:
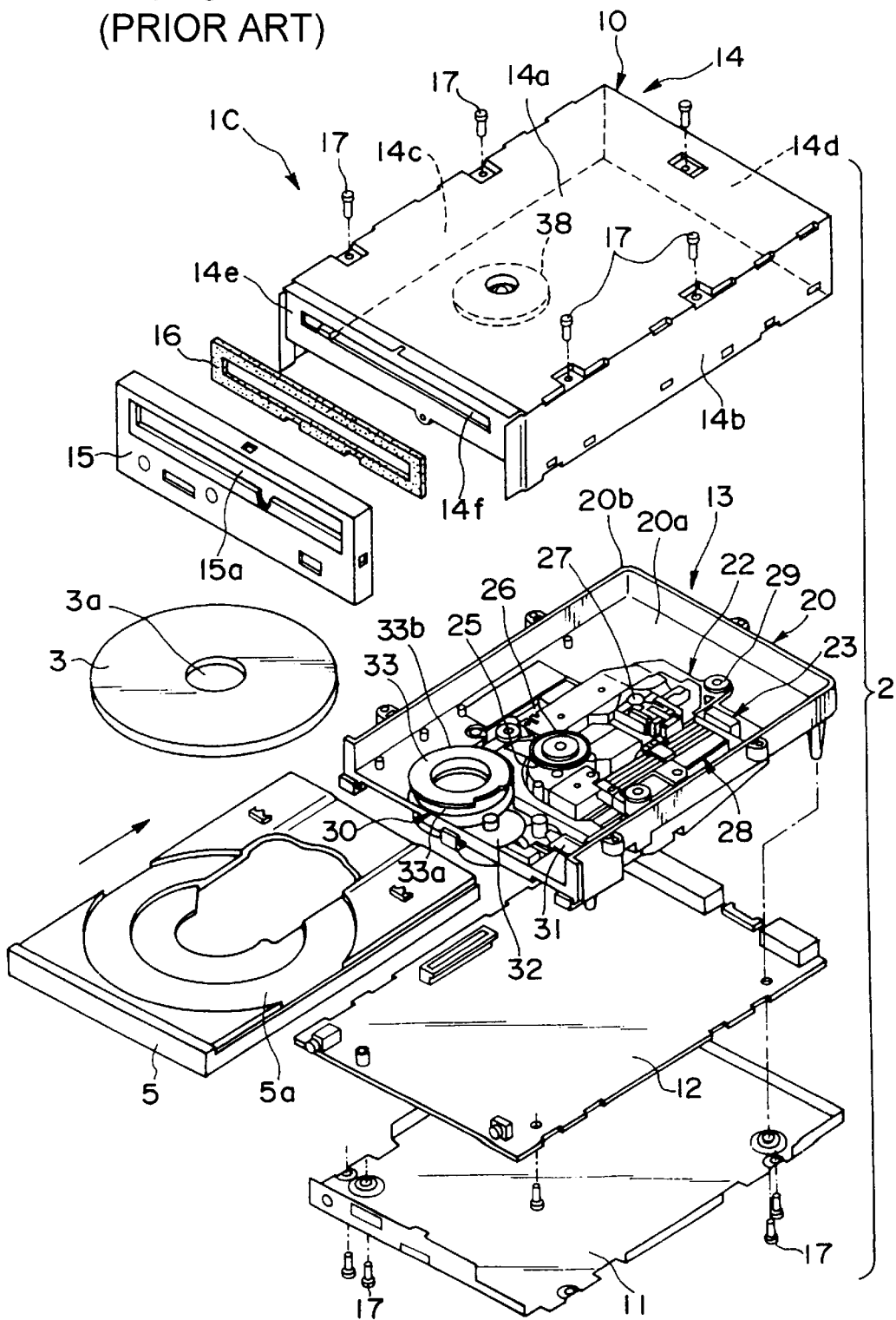
FIG. 1 is a perspective view of a conventional disc drive.
Figure 4:
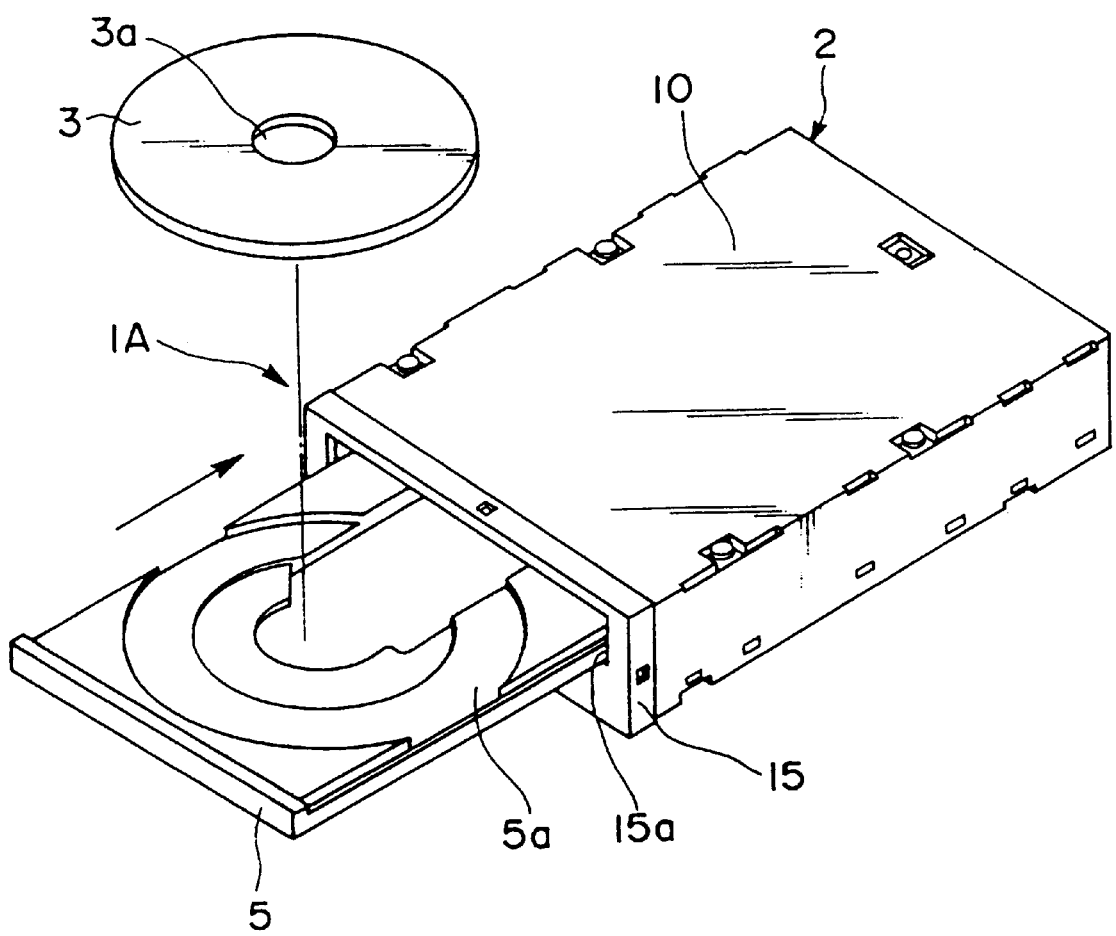
FIG. 4 is a perspective view of a disc drive according to the present invention.

FIG. 4 is a perspective view of an embodiment of a disc drive 1A according to the present invention. As shown in FIG. 4, the disc drive 1A of the present invention is a device for playing back or recording and playing back an optical disc 3, such as a photo CD or the like, in the same manner as the prior art device shown in FIG. 1. The disc drive 1A is roughly constructed from the main body 2 and a disc tray 5 which moves in the forward and backward direction (horizontal direction) with respect to the main body 2 in order to transport the optical disc 3.

In the same manner as was described above for the prior art apparatus shown in FIG. 1, the main body 2 includes a circuit substrate assembly (not show in the drawings) and a mechanism assembly provided on the circuit substrate assembly, and they are housed in a casing 10.

The casing 10 is constructed from a plurality of metal plates, with the front portion thereof being provided with a front panel 15 having an aperture 15a.

Figure 5:
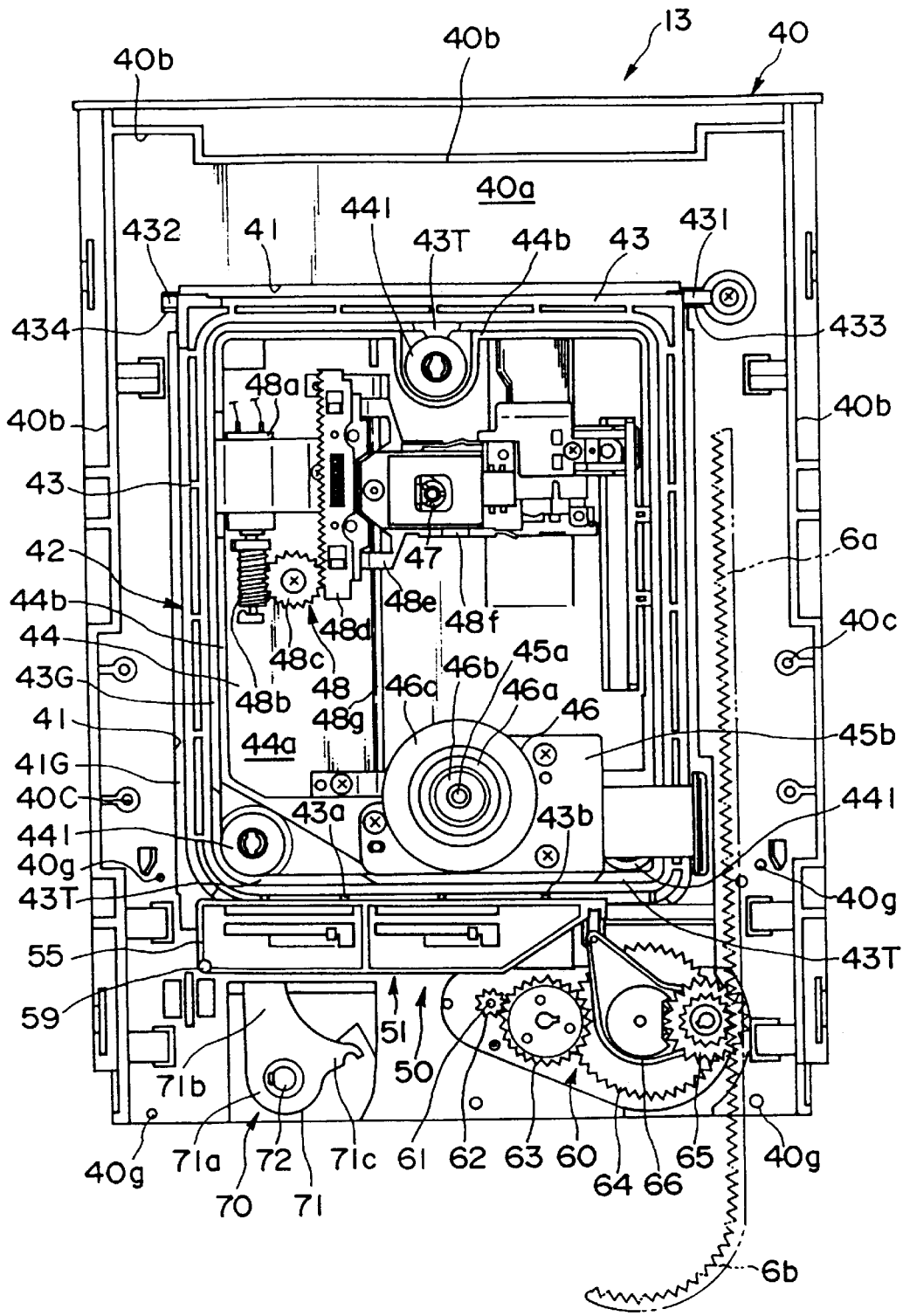
FIG. 5 is a planar view of a main body of the disc drive according to the present invention, in which a mechanism unit is shown in a lowered position.
Figure 6:
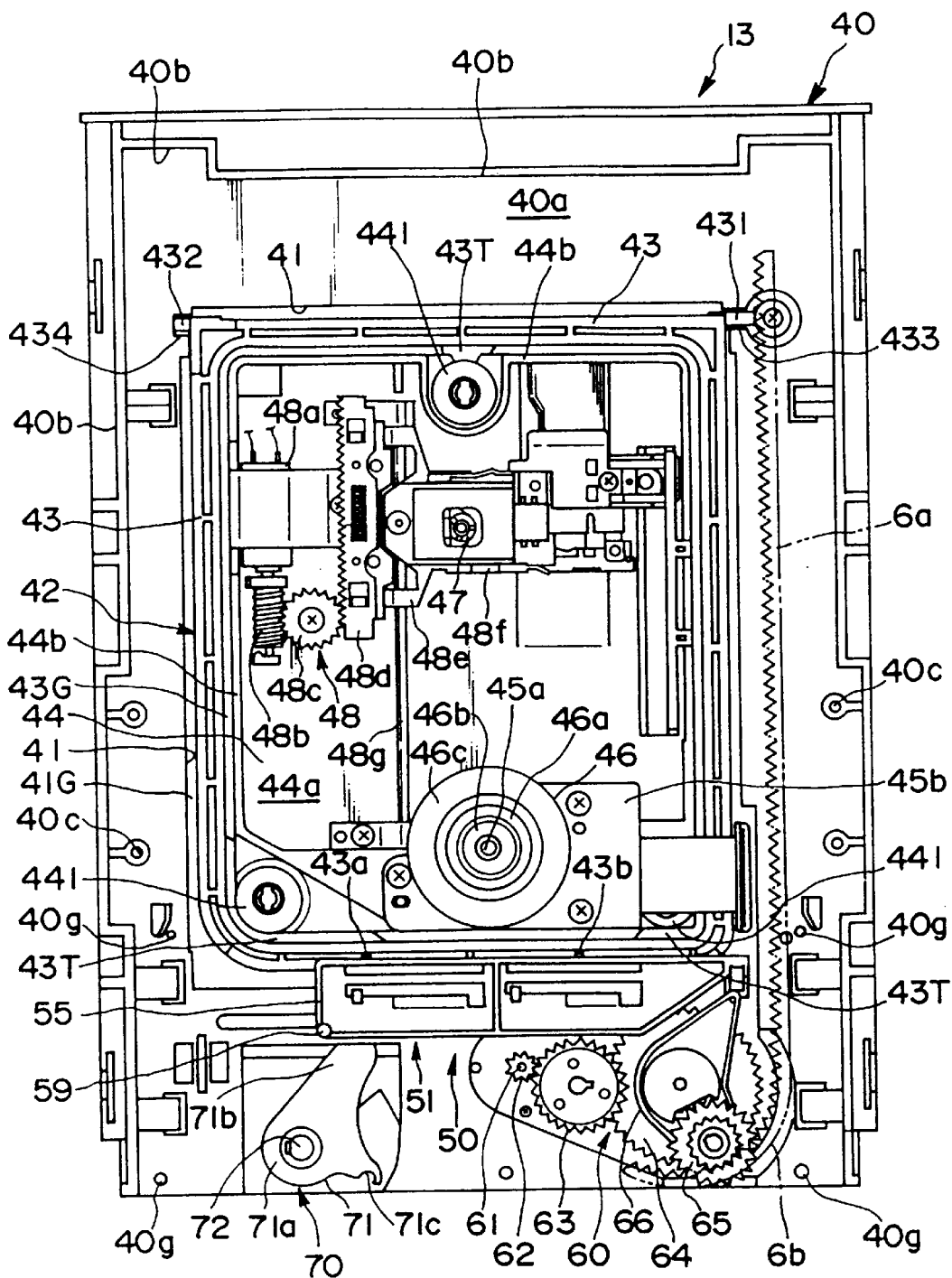
FIG. 6 is another planar view of the main body of the disc drive according to the present invention, in which the mechanism unit is shown in a raised position.

FIG. 5 is a planar view of a main body 2 of the above embodiment from which the casing 10 is removed, which shows a state in which a mechanism unit 42 is in a lowered position (lower position), and FIG. 6 is another planar view of the main body 2 of the same embodiment, which shows a state in which the mechanism unit 42 is in a raised position (upper position).

As shown in FIGS. 5 and 6, the mechanism assembly 13 which is housed inside the casing 10 is shaped roughly like a container and includes an chassis 40 which is preferably constructed from a hard resin. The chassis 40 is constructed from a roughly rectangular-shaped bottom portion 40a and a U-shaped wall portion 40b which stands erect along the left, right and back edge portion of the bottom portion 40a.

In this way, no wall portion is formed in the front of the chassis 40 in order to allow the front of the chassis 40 to be open. Further, when the mechanism assembly 13 is assembled into the casing 10, the open front portion of the chassis 40 is aligned with the aperture 15a of the front panel 15 provided on the casing 10, so that the disc tray 5 can be moved into and out of the casing 10 through the aperture 15a.

As shown in FIG. 4, the disc tray 5 is provided with a shallow concave disc supporting portion 5a into which the optical disc 3 is placed to enable the optical disc 3 to be transported to a prescribed disc loaded position.

Figure 7:
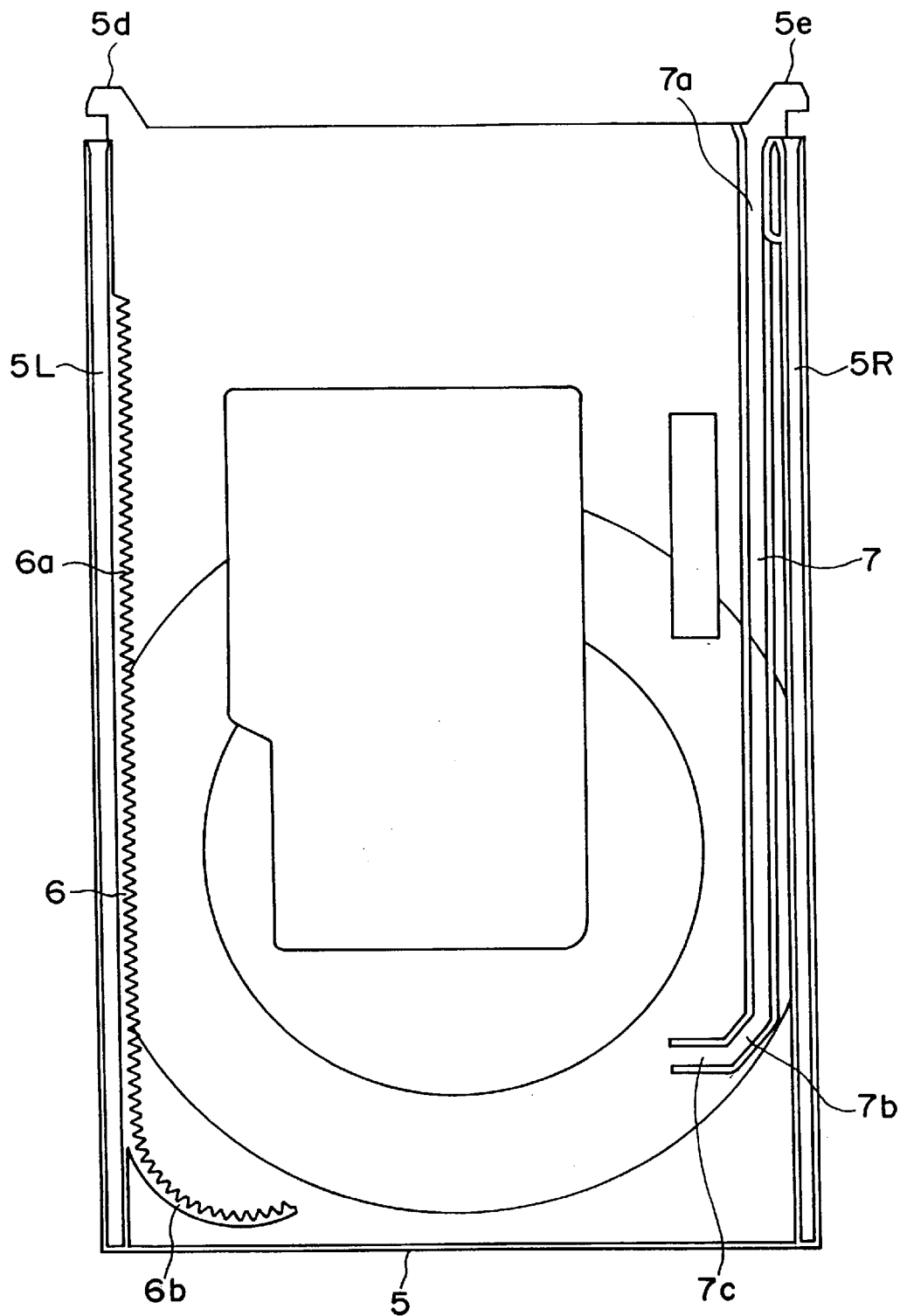
FIG. 7 is a bottom view of the construction of the underside of a disc tray of the disc drive according to the present invention.

As shown in FIG. 7, on the left and right portions of the bottom portion 40a of the chassis 40, there are provided with protruding guide members 40g (FIGS. 5, 6) which engage with guide grooves 5L, 5R formed in left and right side portions of the underside surface of the disc tray 5. Further, the underside surface of the disc tray 5 is further provided with a rack gear 6. The rack gear 6 includes a first rack 6a which extends in a straight line in the forward and backward direction along the guide groove 5L and a roughly 90 degree arc-shaped second rack 6b which is formed at the front end portion (the front side of the disc tray 5, as shown in the lower portion of FIG. 7) of the first rack 6a so as to be continuous therewith.

Further, as shown in FIG. 7, a cam member movement restricting groove 7 is provided on the underside surface of the disk tray 5 along the guide groove 5R which is positioned at the opposite side of the first rack 6a. This cam member movement restricting groove 7 is constructed from a first movement restricting groove 7a which extends parallel to the first rack 6a, a second movement restricting groove 7b which slants at a roughly 45 degree angle with respect to the first movement restricting groove 7a, and a third movement restricting groove 7c which slants at a roughly 45 degree angle with respect to the second movement restricting groove 7b. Accordingly, the third movement restricting groove 7c is arranged at a roughly 90 degree angle with respect to the first movement restricting groove 7a.

Further, as shown in FIGS. 5 and 6, the chassis 40 is provided with a mechanism unit 42 equipped with a turntable 46 for rotating an optical disc 3, an optical pick-up 47 for playing back or recording and playing back the optical disc 3. The mechanism unit 42 is arranged inside a roughly rectangular-shaped opening 41 formed in the bottom portion 40a of the chassis 40, with the rear portion of the mechanism unit 42 being supported in a manner that makes it possible for such rear portion to pivot with respect to the chassis 40 in order to enable the front portion of the mechanism unit 42 to be displaced between a raised position (upper position; FIG. 6) in which the optical disc 3 is supported on the turntable 46 and a lowered position (lower position; FIG. 5) which is lower than the raised position.

In particular, as shown in FIGS. 5 and 6, the mechanism unit 42 includes a base frame 43 constructed preferably from hard resin, and a support member (support plate) 44 which is supported by the base frame 43 via an elastic member (insulator) 441.

The base frame 43 is formed so as to have a roughly rectangular shape which includes a front portion and a rear portion. Formed on the left and right side portions of the rear side of the base frame 43 (the back portion of the main body 2) are protruding axles 431, 432 which act as pivotal axles to enable the mechanism unit 42 to pivot with respect to the chassis 40. These axles 431, 432 are inserted into respective axle holes 433, 434 formed in the opposite inner sides of the chassis 40. By mounting the rear portion of the mechanism unit 42 with the axles 431, 432 in this way, the front portion of the mechanism unit 42 is able to pivot with respect to the chassis 40 between the lowered position shown in FIG. 5 and the raised position shown in FIG. 6.

Figure 9:
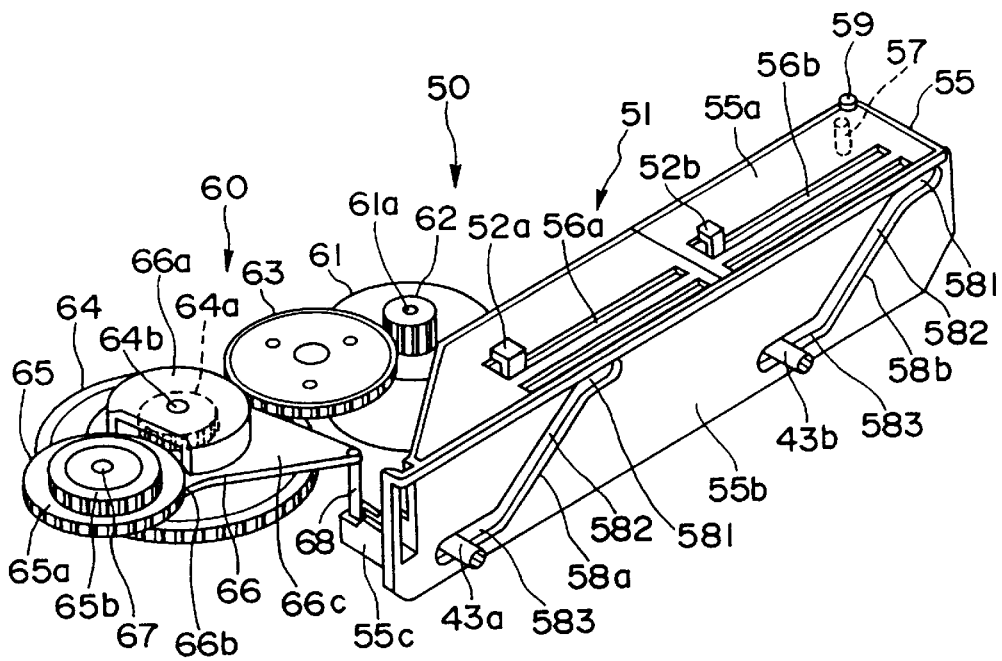
FIG. 9 is a perspective view showing the structure of a cam member used in the disc drive according to the present invention, in which the cam member is shown in a first position.
Figure 10:
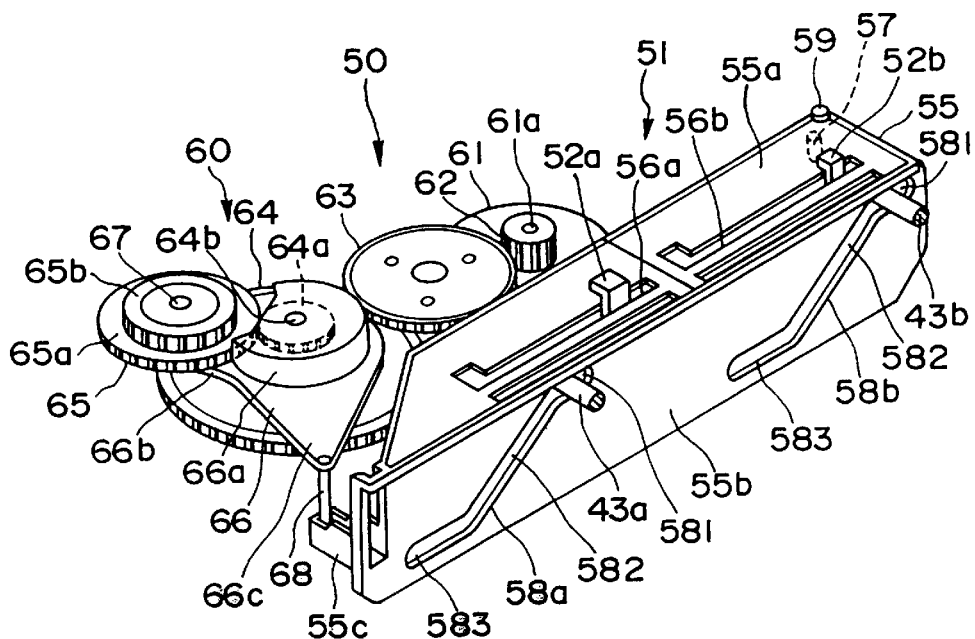
FIG. 10 is a perspective view showing the structure of the cam member used in the disc drive according to the present invention, in which the cam member is shown in a second position.

Further, a pair of protruding guide pins 43a, 43b are formed on the front of the base frame 43 (See FIGS. 9 and 10). These guide pins 43a, 43b are engaged respectively with cam grooves 58a, 58b of a cam member 55 of a cam mechanism 51 (described hereinbelow) through a pair of guide slots (not shown in the drawings) formed in the wall of the front portion of the chassis 40 which defines the opening 41 of the chassis 40. This enables the front portion of the base frame 43 to be guided up or down in accordance with the displacements of the cam member 55.

Taking the possibility of deformation (thermal deformation or the like) of the chassis 40 into account, a spacing 41G is provided between the base frame 43 and the chassis 40 which defines the opening 41. Specifically, this spacing 41G is provided around roughly the entire circumference of the base frame 43, and in this way the pivotal movement of the base frame 43 is not hindered even when the chassis 40 undergoes maximum distortion.

The support member 44 is constructed from a roughly rectangular-shaped bottom plate portion 44a and a wall portion 44b formed around the circumference of the bottom plate portion 44a. The wall portion 44b is one size smaller than the base frame 43 such that the wall portion 44b is arranged inside the frame of the base frame 43 via a prescribed spacing 43G. The support member 44 is supported by the base frame 43 via the elastic members (insulators) 441 provided on tabs 43T formed at the left and right corner portions of the front side of the base frame 43 and at roughly the middle of the rear portion of the base frame 43. Namely, the support member 44 is supported on the base frame 43 via the elastic members 441 provided at three points which roughly form an isosceles triangle.

Figure 8:
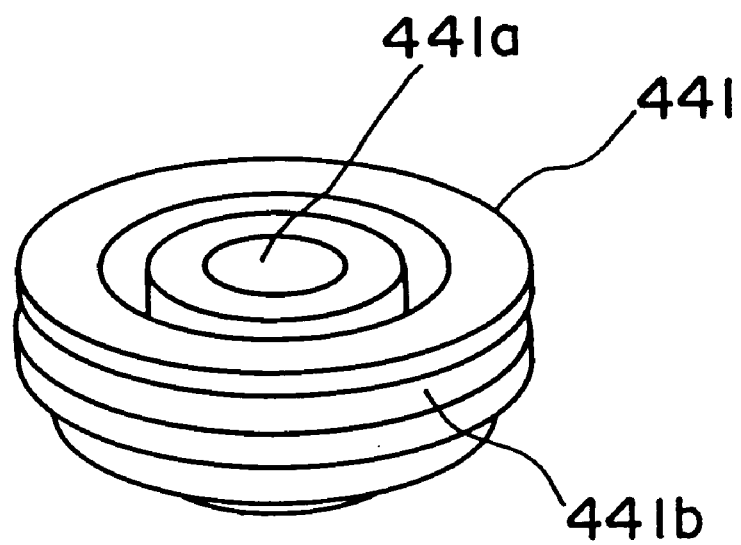
FIG. 8 is a perspective view showing the structure of one of elastic members used in the disc drive according to the present invention.

As shown in FIG. 8, each elastic member 441, which is formed from an elastic material such as rubber or the like, has a roughly cylindrical shape and includes a center hole 441a which is formed in an axial direction thereof and a groove 441b formed in the outer circumferential surface in the circumferential direction thereof. Further, the center hole 441a of each elastic member 441 fits onto an axis provided on the respective tabs 43T of the base frame 43 and then the groove 441b fits over a respective notched portion formed at the corresponding position of the support member 44.

Further, as shown in FIGS. 5 and 6, the support member 44 is provided with a spindle motor 45 for rotating an optical disc 3, a turntable 46 fixed to a rotation axis 45a of the spindle motor 45, and optical pick-up 47 (which includes an actuator), and an optical pick-up moving mechanism 48 for moving the optical pick-up 47 in the radial direction of the optical disc 3. The spindle motor 45 is mounted on a motor support 45b which is fixed to the support member 44 and which is formed from a metalic plate. The spindle motor 45 is capable of rotating the optical disc 3 at a high rotational speed, for example, at a speed capable of rotating the optical disc 3 at 200–6400 rpm.

The turntable 46 is a disc-shaped member which includes a protruding ring-shaped center hub 46a formed in the center portion of the turntable 46. This center hub 46a is adapted to fit into a center hole 3a of the optical disc 3. Further, the center hub 46a is formed so as to taper from the tip to the base in order to prevent the optical disc 3 from slipping off center when placed on the turntable 46. Further, a ring-shaped permanent magnet 46b for creating an attraction force on a disc clamper (described below) is provided in the center hub 46a in the circumferential direction of the rotation axis 45a of the spindle motor 45.

Further, a ring-shaped pad 46c is bonded to the upper part of the turntable 46 (i.e., the side used to support the optical disc 3) around the circumference of the center hub 46a. The pad 46c is made from an elastic material, such as various rubbers, soft resins or porous materials (sponges), which is constructed so as to have a relatively high coefficient of friction in order to prevent the optical disc 3 from slipping when rotating the optical disc 3.

The optical pick-up 47 is a flat type optical pick-up constructed so as to deflect light reflected from the optical disc 3 by roughly 90 degrees using a mirror (or prism) or the like to guide such light toward a light gathering element such as a photodiode or the like.

As shown in FIGS. 5 and 6, the optical pick-up moving mechanism 48 is constructed from a motor 48a capable of forward/reverse rotation, a worm 48b which is rotated by the motor 48a, a worm wheel 48c which meshes with the worm 48b, a rack gear 48d which meshes with the worm wheel 48c, a slider 48e which is fixed to the rack gear 48d, a guide rod 48g which regulates the direction of movement of the slider 48e, and a head support (actuator base) 48f which is integrally formed with the slider 48e. The head support 48f being provided with the optical pick-up 47. Further, the worm 48b and the guide rod 48g are arranged so that their lengthwise directions are directed roughly parallel to the forward and backward direction of the disc drive 1A.

In this type of optical pick-up moving mechanism 48, if the worm 48b is rotated in a prescribed direction by the motor 48a, this rotation is transmitted through these gears, and this force causes the slider 48e to move along the guide rod 48g in the forward-backward direction of the disc drive 1A, whereby the optical pick-up 47 fixed to the head support 48f is moved in the radial direction of the optical disc 3 loaded on the disc tray 5. In this construction, the optical pick-up 47 and the optical pick-up moving mechanism 48 form a playback means for reproducing information recorded in the program area 3e of the optical disc 3.

Further, the operations of the spindle motor 45, the motor 48a for moving the optical pick-up 47 and a loading motor 61 (described below) are controlled by a control means (CPU) provided in the circuit substrate assembly (not shown in the drawings).

As shown in FIGS. 5 and 6, in front of the mechanism unit 42, there is provided a loading mechanism 50 for displacing the mechanism unit 42 between the lowered position (FIG. 5) and the raised position (FIG. 6) as well as for moving the disc tray 5 between the play back position and the eject position.

Namely, the loading mechanism 50 includes a cam mechanism 51 which is cooperated with the mechanism unit 42 and can be displaced between a first position (FIG. 5) and a second position (FIG. 6), and a driving mechanism 60 for driving the disc tray 5 and the cam mechanism 51.

The cam mechanism 51 is operated to displace the mechanism unit 42 into the lowered position when the cam mechanism is in the first position shown in FIG. 5 and to displace the mechanism unit 42 into the raised position when it is in the second position shown in FIG. 6. In more details, as shown in FIGS. 9 and 10, the cam mechanism 50 includes a cam member 55 arranged so as to be slidable between the first position (FIG. 9) and the second position (FIG. 10) in the sideways direction with respect to the chassis 40 (i.e., the horizontal direction orthogonal to the direction of movement of the disc tray 5). The cam member 55 is constructed from a roughly plate-shaped horizontal portion 55a and a plate-shaped vertical portion 55b which is integrally formed with one lengthwise edge of the horizontal portion 55a so as to make a structure having a roughly L-shaped cross section.

Formed on the horizontal portion 55a of the cam member 55 are sideways guide grooves 56a, 56b which engage respectively with a pair of protrusions 52a, 52b which protrude from the top of the front portion of the chassis 40. Further, the underside surface of the horizontal portion 55a is provided with an engaging pin 57 which is inserted into an elongated slot formed in the front portion of the chassis 40. This engaging pin 57 is adapted to cooperate with an emergency eject mechanism (described below).

Further, the vertical portion 55b of the cam member 55 is positioned to face the front wall which defines the opening 41 of the chassis 40. Formed in the vertical portion 55b are a pair of cam grooves 58a, 58b each having the same shape. Namely, each of the cam grooves 58a, 58b is constructed from a horizontally extending upper groove 581 and lower groove 583 and a slanting groove 582 which connects the upper groove 581 and lower groove 583.

Further, the guide pins (following members) 43a, 43b adapted for insertion into the cam grooves 58a, 58b, respectively, are provided on the front surface of the base frame 43 of the mechanism unit 42 as described above.

In this way, when the cam member 55 is moved between the first position and the second position, the guide pins 43a, 43b are moved by the slide abutment with the cam grooves 58a, 58b in the up and down direction.

Namely, when the cam member 55 is positioned at the first position, the guide pins 43a, 43b are engaged with the lower grooves 583 (FIG. 9), and the front portion of the mechanism unit 42 is kept in the lowered position shown in FIG. 5. When the cam member 55 is moved from the first position to the second position, the guide pins 43a, 43b move up by the slanting grooves 582, thereby causing the front portion of the mechanism unit 42 to move from the lowered position toward the raised position. Then, when the cam member 55 reaches the second position, the guide pins 43a, 43b engage with the upper grooves 581 (FIG. 10), and the front portion of the mechanism unit 42 is displaced to the raised position shown in FIG. 6.

Further, a protrusion 59 is integrally formed on an end portion of the horizontal member 55a of the cam member 55 to engage with the cam member movement restricting groove 7 formed in the underside surface of the disc tray 5. As a result, when the protrusion 59 is engaged with the first movement restricting groove 7a of the disc tray 5, the cam member 55 is prevented from moving in the sideways direction, whereby the cam member 55 is held at the first position. Then, in accordance with the movement of the disc tray 5, the protrusion 59 slides from the first movement restricting groove 7a to the second movement restricting groove 7b, and upon moving through the slanting groove of the second movement restricting groove 7b, the cam member 55 is displaced within the range of the lower grooves 583 of the cam grooves 58a, 58b of the cam member 55. Then, when the protrusion 59 reaches the position of the third movement restricting groove 7c, the cam member 55 can move toward the second position.

As shown in FIGS. 9 and 10, the drive mechanism 60 includes a loading motor 61 capable or forward/reverse rotation provided in the underside surface of the front portion of the chassis 40, a pinion gear 62 mounted on a rotation axis 61a of the motor 61, a medium-diameter second gear 63 which meshes with the pinion gear 62, and a large-diameter third gear 64 which meshes with a small gear (not shown in the drawings) fixed coaxially below the second gear 63. Further, a small-diameter cylindrical portion is integrally formed on top of the third gear 64 so as to be coaxial therewith, with a small gear 64a being integrally formed on top of this cylindrical portion so as to be coaxial therewith. Meshing with the small gear 64a of the third gear 64 is an operative gear 65 which meshes with the first and second racks 6a, 6b of the disc tray 5. Namely, the operative gear 65 includes a lower gear 65a which meshes with the small gear 64a of the third gear 64, and an upper gear 65b which meshes with the first and second racks 6a, 6b of the disc tray 5, in which the upper gear 65b being integrally formed on the same axis as the lower gear 65a.

In the present embodiment, the gears 62–65 are flat teeth gears, which constitute a rotational speed reduction mechanism for the loading motor 61 of the loading mechanism 50.

The operative gear 65 is provided so as to be capable of rotation about a rotation axis 67 provided on a planetary arm 66 mounted to a revolution axis 64b of the third gear 64. The planetary arm 66 includes a rotation portion 66a which is rotatably fitted onto the cylindrical portion of the third gear 64, and first and second arms 66b, 66c which extend from the rotation portion 66a, so that the whole of the planetary arm 66 has a roughly v-shaped structure.

One end of the first arm 66b of the planetary arm 66 is provided with the protruding rotation axis 67 to which the operative gear 65 is rotatably mounted as described above. Namely, the operative gear 65 rotates about the axis 67 of the first arm 66b which functions as a rotation axis thereof as well as the operative gear 65 also turns around the axis 64b which functions as a revolution axis, so that the operative gear 65 functions as a planetary gear which can be turned around the axis 64b along the second rack 6b with being rotated about the axis 67. In this planetary gear mechanism, the operative gear 65 acts as a planet gear and the small gear 64a of the third gear 64 acts as a sun gear. Further, the end of the second arm 66c of the planetary arm 66 is provided with a pin 68 which protrudes downward into an engaging portion 55c formed in the cam member 55.

In this connection, as shown in FIGS. 9 and 10, one part of the rotation portion 66a of the planetary arm 66 is partially cut away to expose the small gear 64a of the third gear 64 in order to enable the lower gear 65a of the operative gear 65 to mesh with the small gear 64a of the third gear 64.

In this structure, the operative gear 65 carries out a first operation when engaged with the first rack 6a of the disc tray 5, in which the disc tray 5 is moved between the disc eject position and the disc loaded position with the cam member 55 being held at the first position, and a second operation when engaged with the second rack 6b of the disc tray 5, in which the cam member 55 is moved between the first position and the second position.

Namely, while the protrusion 59 provided on the top of the horizontal portion 55a of the cam member 55 is in engagement with the first movement restricting groove 7a in the underside surface of the disc tray 5, the movement of the cam member 55 from the first position to the second position is restricted. Accordingly, during such time, that is during the time that the disc tray 5 is moving between the eject position and the loaded position, since the pin 68 of the second arm 66c of the planetary arm 66 is engaged with the engagement portion 55c of the cam member 55, it is impossible for the planetary arm 66 to be turned around the axis 64b. As a result, the operative gear 65 is held at a prescribed position while the protrusion 59 of the cam member 55 is in engagement with the first movement restricting groove 7a of the disc tray 5. In this state, as shown by the dashed line in FIG. 5, the operative gear 65 engages with the first linear rack 6a of the disc tray 5, whereby the disc tray 5 is moved between the disc eject position and the disc loaded position by the rotation of the operative gear according to the rotation of the loading motor 61, and in this way the operative gear 65 functions as a driving gear for moving the disc tray 5.

On the other hand, when the disc tray 5 moves accordingly to a position just before the disc loaded position, the protrusion 59 of the cam member 55 moves from the first movement restricting groove 7a to the second movement restricting groove 7b of the disc tray 5, and this causes the cam member 55 to be displaced by a small amount. Then, the disc tray 5 moves further, and when abutting portions 5d, 5e of the disc tray 5 come into abutment with wall portions 40b of the chassis 40 and thereby further movement of the disc tray 5 is restricted, the protrusion 59 reaches the third movement restricting groove 7c, whereby the cam member 55 is able to move from the first position to the second position. In this state, as shown by the dashed line in FIG. 6, since the operative gear 65 engages with the arc-shaped second rack 6b and the cam member 55 is able to move to the second position and therefore the planetary arm 66 can be turned around the axis 64b, the operative gear 65 moves along the arc-shaped second rack 6b in accordance with the rotation of the loading motor 61.

In accordance with such a turning movement of the operative gear 65, the planetary arm 66 rotates clockwise around the common axis 64b from the position shown in FIG. 9 to the position shown in FIG. 10, which in turn causes the second arm 66c of the planetary arm 66 to rotate in the same direction. In accordance with this rotation of the second arm 66c, the cam member 55 is driven by means of the pin 68 coupled with the engaging portion 55c and moves from the first position shown in FIG. 9 toward the second position shown in FIG. 10. In accordance with this movement of the cam member 55 from the first position toward the second position, the front guide pins 43a, 43b of the base frame 43 of the mechanism unit 42 rise up along the slanting grooves 582, 582, whereby the front portion of the mechanism unit 42 is displaced from the lowered position shown in FIG. 5 to the raised position shown in FIG. 6.

Further, the disc drive 1A according to the present invention is equipped with an emergency eject mechanism 70 which enables the disc tray 5 to be manually pulled forward to eject the optical disc 3 when the optical disc 3 stops rotating due to a power outage, for example, during the optical disc 3 being rotated for playback.

As shown in FIGS. 5 and 6, the emergency eject mechanism 70 is arranged in the front portion of the chassis 40 and is constructed from a lever 71 which is provided in a rotatable manner on the side of the drive mechanism 60. The lever 71 is a roughly L-shaped member which includes a central portion 71 a fixed to a rotation axis 72, a cam member shifting portion 71b which extends from the central portion 71a, and a push portion 71c which also extends from the central portion 71a so as to be roughly perpendicular to the extending direction of the shifting portion 71b. The front end of the cam member shifting portion 71b meshes with an engagement pin 57 formed on the underside surface of the horizontal portion 55a of the cam member 55, and the tip of the push portion 71c is provided with a jig receiving portion for receiving a jig (not shown in the drawings) which is to be inserted through an aperture (not shown in the drawings) formed in the front panel 15.

With the emergency eject mechanism 70 constructed in this way, if the cam member 55 is moved from the first position shown in FIG. 9 (FIG. 5) to the second position shown in FIG. 10 (FIG. 6), the engagement pin 57 formed on the underside of the horizontal portion 55a of the cam member 55 moves the cam member shifting portion 71b, thereby rotating the lever 71 to the position shown in FIG. 6. In this second position, the mechanism unit 42 is displaced into the raised position and the optical disc 3 is played back.

Now, in the case where a power outage occurs in this condition, the loading motor 61 of the drive mechanism 60 stops operating, and this causes the mechanism unit 42 to stay at the raised position, thereby making it impossible to electronically eject the optical disc 3.

In such case, a elongated pin-shaped jig is inserted through the aperture (not shown in the drawings) formed in the front panel 15 of the disc drive 1A, with the tip of the jig coming into contact with the jig receiving portion 71c of the lever 71, and then in this state the jig is manually pushed further inward. When this is done, the lever 71 rotates in the counterclockwise direction about the rotation axis 72 from the position shown in FIG. 6, and in accordance with such rotation, the cam member shifting portion 71b moves the engagement pin 57 of the cam member 55 in the sideways direction, and as a result, the cam member 55 is moved from the second position (FIG. 10) to the first position (FIG. 9). Accordingly, the mechanism unit 42 also moves from the raised position (FIG. 6) to the lowered position (FIG. 5), thereby disengaging the optical disc 3 from the turntable 46 and causing the disc tray 5 to slightly protrude out of the aperture 15a of the front panel 15. In this state, the operative gear 65 of the drive mechanism 60 engages with the first rack 6a of the disc tray 5, thereby making it possible to grasp the protruding portion of the disc tray 5 and manually pull it out through the aperture 15a of the front panel 15.

Figure 11:
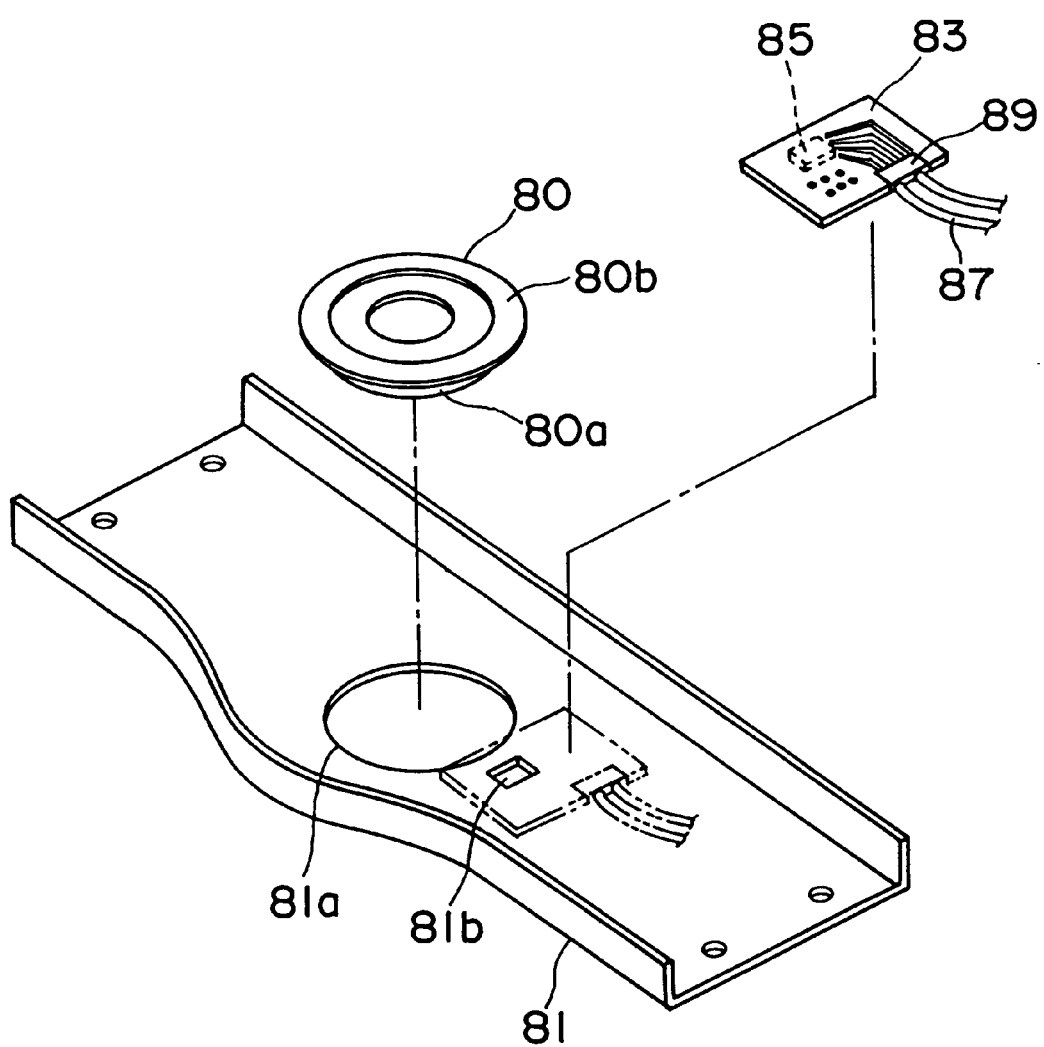
FIG. 11 is a perspective view showing the structure of a disc clamper and the mounting position of a bar code reader used in one embodiment of the disc drive according to the present invention.

Further, a disc clamper 80 is provided on the upper portion of the chassis 40, and as shown in FIG. 11, the disc clamper 80 is rotatably supported by a plate-shaped support member 81 having a central opening 81a.

In particular, the support member 81 is fastened at both ends with bosses (or rivets) to mounting portions 40c of the chassis 40 so as to secure the support member 81 to the chassis 40 in the side-ways direction. On the other hand, the disc clamper 80 is formed from a flat drum-shaped main body 80a having a bottom portion that is inserted into the opening 81a of the support member 81, and a flange portion 80b which is formed around the upper circumferential portion of the main body 80a. The flange portion 80b is adapted to be supported on the top surface of the support member 81. Further, an annular steel attraction member is provided inside the main body 80a, and it is adapted to be pulled by the permanent magnet provided in the turntable 46.

Figure 12:
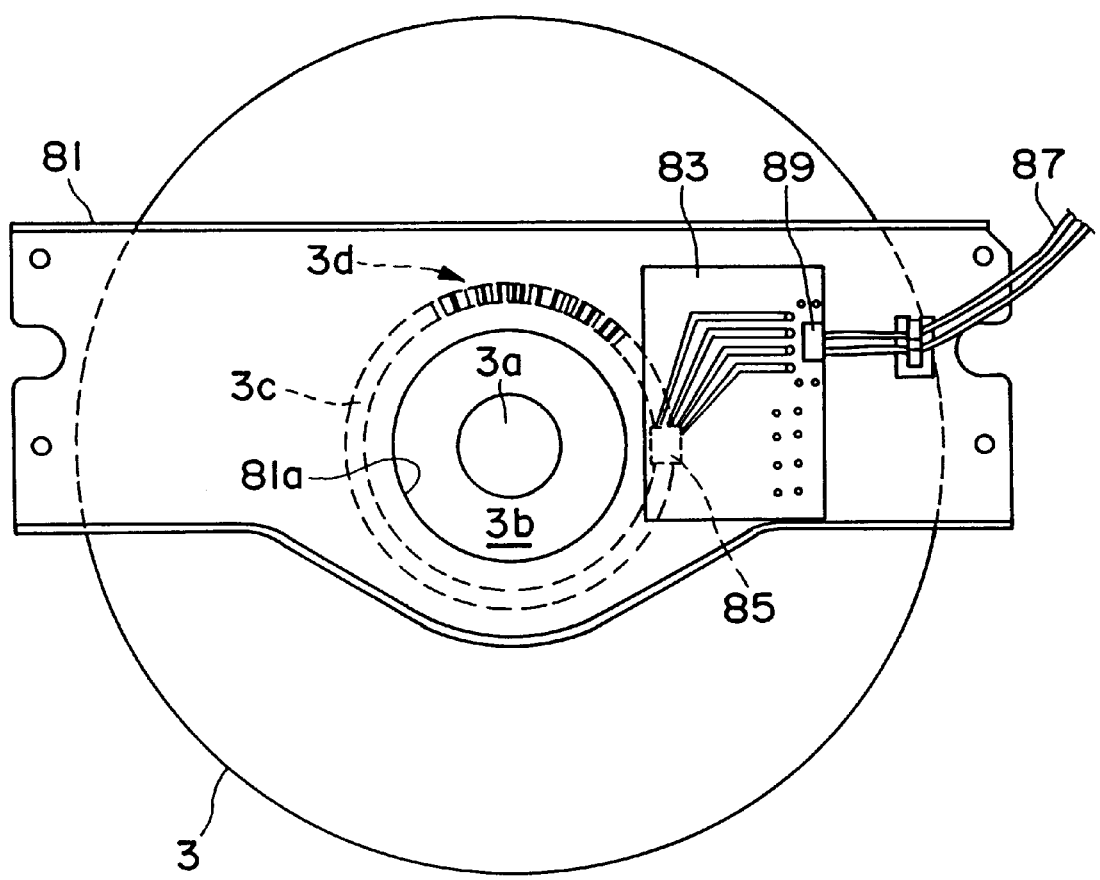
FIG. 12 is a top planar view which shows the state where the bar code of the optical disk is read by a bar code reader of the disc drive according to the present invention.
Figure 13:
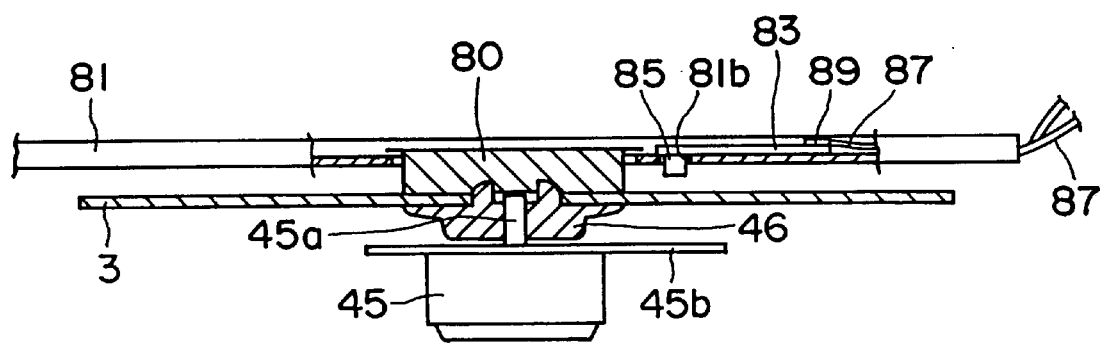
FIG. 13 is a cross-sectional view which shows the state where the optical disc is loaded and the bar code is read by the bar code reader of the disc drive according to the present invention.

Further, as shown in FIGS. 11 through 13, a circuit substrate 83 is also provided on the support member 81. Provided on the surface of the circuit substrate 83 which is in contact with the support member 81 is a photo-interrupter (bar code reader) 85 which includes a light emitting element and a light receiving element (not shown in the drawings). The photo-interrupter functions as an identification indication reading means for reading out the bar code 3d of the optical disc 3. Further, a signal line 87 for outputting signals from the photo-interrupter 85 extends from one end of the circuit substrate 83 via connector 89.

On the other hand, an aperture 81b separate from aperture 81a is formed in the support member 81. This aperture 81b is provided so as to be positioned above the bar code area 3c when the optical disc 3 is in a loaded position, and the photo-interrupter 85 described above is positioned above the aperture 81. Accordingly, when the optical disc 3 is loaded, the photo-interrupter 85 is positioned on the opposite side of the optical disc relative to the optical pick-up 47 at a position corresponding to the bar code area 3c.

In this embodiment, by taking into account the relationship with the mounting position of the photo-interrupter 85 with respect to the disc clamper 80, it is possible to select an appropriate size and shape for the disc clamper 80.

Next, a description of the operation of the disc drive 1A will be given.

When the disc drive 1A is not is use, the empty disc tray 5 is housed inside the casing 10 (inside the main body 2) at the disc loaded position. In this state, as shown in FIG. 6, the mechanism unit 42 is in the raised position, the cam member 55 is in the second position, and the protrusion 59 of the horizontal portion 55a of the cam member 55 is in the third movement restriction groove 7c. Further, as shown by the dashed lines in FIG. 6, the operative gear 65 of the drive mechanism 60 meshes an end portion of the second rack 6b of the underside surface of the disc tray 5 which is far away from the first rack 6a thereof.

Now, if an eject operation is carried out, the loading motor 61 will rotate in a prescribed direction, whereby the operative gear 65 is caused to rotate in a clockwise direction in FIG. 6, by means of a rotational speed reduction mechanism. In this state, the operative gear 65 functions as a planetary gear which can be turned around the revolution axis 64b, and in accordance with this revolution, the operative gear 65 moves along the second rack 6b toward the first rack 6a. In accordance with the revolution of the operative gear 65, the planetary arm 66 rotates in the counterclockwise direction about the common axis 64b. In accordance with the rotation of the planetary arm 66, the second arm 66c causes the cam member 55 to move, via the pin 68, from the second position shown in FIG. 6 (FIG. 10) to the first position shown in FIG. 5 (FIG. 9), whereby the mechanism unit 42 is also moved from the raised position to the lowered position. In this case, while the cam member 55 is moving from the second position to the first position, the protrusion 59 on top of the horizontal portion 55a of the cam member 55 slides along the third movement restricting groove 7c, and reaches the first movement restricting groove 7a via the second movement restricting groove 7b.

At that point, the operative gear 65 moves from the arc-shaped second rack 6b to the linear first rack 6a, and the protrusion 59 of the cam member 55 also moves from the second movement restricting groove 7b to the first movement restricting groove 7a. When the protrusion 59 of the cam member 55 is moved to the first movement restriction groove 7a, the cam member 55 is restricted from moving in the sideways direction, so that the rotation of the planetary arm 66 is also restricted. In this state, the operative gear 65 is kept at that position and acts as a driving gear to drive the disc tray 5. As a result, as shown by the dashed line in FIG. 5, the operative gear 65 engages with the first rack 6a of the disc tray 5, whereby the disc tray 5 is moved from the loaded position to the eject position. In this state, the mechanism unit 42 is displaced to the lowered position at a prescribed spacing from the disc clamper 80. Accordingly, the disc clamper 80 and the turntable 46 do not hinder the eject operation of the disc tray 5.

Now, if a loading operation is carried out after placing the optical disc 3 into the disc supporting portion 5a of the disc tray 5 which is ejected to the outside through the aperture 15a of the front panel 15, the loading motor 61 will rotate in the opposite direction (i.e., the direction opposite to that described above), thereby causing the operative gear 65 to rotate, via the rotational speed reduction mechanism, in the counterclockwise direction (i.e., reverse direction) shown in FIG. 5. Accordingly, the disc tray 5 moves backward (toward the rear of the disc drive) through the aperture 15a to the disc loaded position. In this way, the optical disc 3, which is placed in the disc supporting portion 5a on top of the disc tray 5, is also transported to the disc loaded position inside the main body 2.

During the loading operation of the disc tray 5, namely while the disc tray 5 is moving backward, the operative gear 65 engages with the first rack 6a on the underside surface of the disc tray 5, and the protrusion 59 of the cam member 55 is guided along the first movement restriction groove 7a. Accordingly, the cam member 55 is held at the first position, and is therefore unable to move to the second position. Consequently, the planetary arm 66 is held at a prescribed position so as to be unable to rotate. In this case, the operative gear 65 rotates at such a position, so that it functions as a driving gear for driving the disc tray 5. Further, in this state, the front portion of the mechanism unit 42 is held at the lower position.

When the disc tray 5 approaches the disc loaded position, the protrusion 59 formed on the cam member 55 moves from the first movement restriction groove 7a to the second movement restriction groove 7b, thereby causing the cam member 55 to move slightly in the sideways direction. Then, when the disc tray 5 reaches the disc loaded position, abutment portions 5d, 5e provided on the rear portion of the disc tray 5 abut the wall portion 40b of the chassis 40, thereby restricting further movement of the disc tray 5. In this state, the protrusion 59 of the cam member 55 moves to the third movement restriction groove 7c via the second movement restriction groove 7b, thereby enabling the cam member 55 to move from the first position to the second position, which in turn also makes it possible for the planetary arm 66 to rotate. In this state, the operative gear 65 moves from the first rack 6a to the second rack 6b.

As a result, in this state, because the movement of the disc tray 5 is restricted while the planetary arm 66 is capable of revolution, if the operative gear 65 is rotated by the loading motor 61, the operative gear 65 moves while rotating along the arc-shaped second rack 6b about the axis 64b. Therefore, in this state, the operative gear 65 functions as a planetary gear.

When the operative gear 65 functions as a planetary gear and moves along the arc-shaped second rack 6b as described above, the planetary arm 66 also rotates in accordance with the movement of the operative gear 65 around the common axis 64b in the clockwise direction in FIG. 5. When the planetary arm 66 rotates in this way, the second arm 66c of the planetary arm 66 also rotates in the same direction, thereby causing the cam member 55 to move from the first position to the second position.

In accordance with the movement of the cam member 55, the guide pins 43a, 43b of the front end of the base frame 43 of the mechanism unit 42 slide along the slanting grooves 582 of the cam grooves 58a, 58b and move upward to the upper grooves 581. Accordingly, the mechanism unit 42 is displaced from the lowered position to the raised position, whereby the central hole 3a of the optical disc 3 supported on the disc tray 5 engages with the center hub 46a of the turntable 46. Then, due to the attracting force which acts on the disc clamper 80 by means of the permanent magnet 46b of the turntable 46, the optical disc 3 is held between the turntable 46 and the disc clamper 80.

Figure 14:
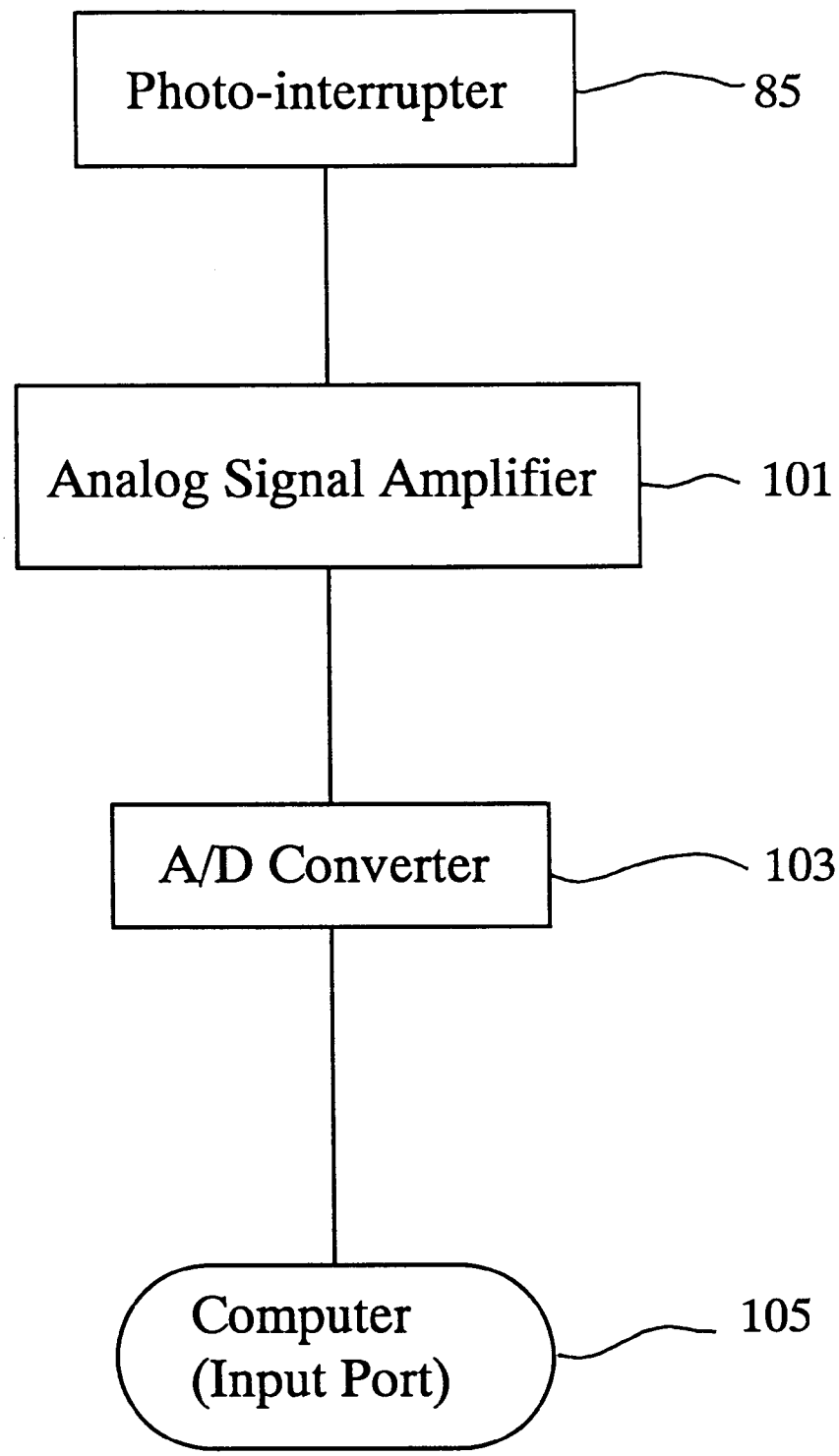
FIG. 14 is a block diagram which shows a bar code signal processing circuit between the disc drive according to the present invention and a personal computer equipped with the disc drive.

In this state, when a start switch or the like is operated, the spindle motor 45 is rotates, thereby rotating the optical disc 3 placed on the turntable 46. When the optical disc 3 begins to rotate, a bar code reading is carried out first. Namely, light emitted from the light emitting element of the photo-interrupter 85 is projected onto the bar code area 3c of the optical disc 3, and a scan of the bar code 3d is carried out. The light emitted from the light emitting element of the photo-interrupter 85 is reflected by the bar code area 3c, and then such light signal is converted to an analog electrical signal by the light receiving element of the photo-interrupter 85. As shown in FIG. 14, this analog electrical signal is amplified by an analog amplifier 101, and then after undergoing an A/D conversion by an A/D converter 103, thus obtained digital signal is sent to a computer 105 via a prescribed input port. Then, a predetermined software is run based on such digital signal data to identify the disc type and format and obtain information such as the disc manufacturer and place and date of manufacture. In this way, once the disc type has been identified and its format is known, the disc 3 begins to play, and the data which is recorded in the program area 3e is read out.

Furthermore, in the case where the CD that is played is a regular CD-ROM having no bar code, because the photo-interrupter does not detect anything, a regular CD is recognized and play is carried out. Accordingly, the present invention is of course suited for regular CDs.

In the disc drive described above, it is possible to easily mount the photo-interrupter 85 simply by removing the casing 10, and for this reason it is possible to later mount the photo-interrupter 85 in a pre-existing disc drive. Namely, in the case where the bar code is read from the underside of the disc, the mounting of the photo-interrupter 85 requires carefully consideration of the layout around the spindle motor, for example, the layout of the turntable, light pick-up and the like, thus making the possible the mounting positions extremely limited and the mounting of the photo-interrupter 85 very difficult. However, in the case where the bar code is read from above the disc, as is the case in the present embodiment, because there is virtually no restriction on the mounting position of the photo-interrupter above the disc, it is possible to mount the photo-interrupter easily without taking any consideration to the structure around the mounting position of the photo-interrupter. Further, because the photo-interrupter is provided on the opposite side of the optical disc relative to the optical pick-up, it is possible to later provide, that is newly and additionally provide a photo-interrupter without having to change the layout around the optical pick-up, spindle motor, turntable and the like.

Next, a description of a second embodiment of a disc drive according to the present invention will be given with reference to FIG. 15. In this connection, the elements of the second embodiment that are the same as those of the first embodiment will be identified with the same reference characters.

Figure 15:
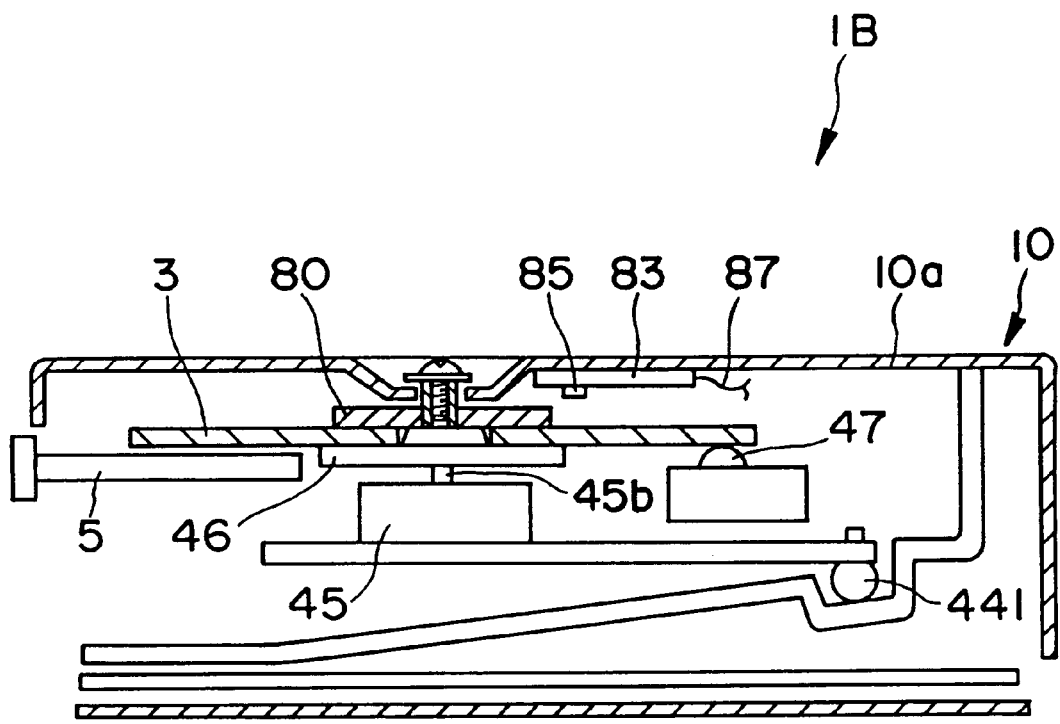
FIG. 15 is a cross-sectional view which shows the state where an optical disc is loaded and the bar code thereof is read by a bar code reader of another embodiment of the disc drive according to the present invention.

In the second embodiment shown in FIG. 15, the disc drive 1B does not include a support member for supporting the disc clamper 80. In this type of disc drive, the disc clamper 80 is provided on the underside (inside) surface of the top plate 10a of the casing 10 so as to rotate coaxially with respect to the turntable 45. Moreover, a circuit substrate 83 provided with a photo-interrupter 85 is arranged in the vicinity of the disc clamper 80 provided on the underside surface of the top plate 10a of the casing 10. The circuit substrate 83 is arranged in such a way as to position the photo-interrupter 85 above the bar code area 3c of an optical disc 3 when the optical disc 3 is in a loaded position. Accordingly, when an optical disc is in a loaded position, the photo-interrupter 85 is on the opposite side of the optical disc 3 relative to the optical pick-up 47.

In the case where the photo-interrupter is to be provided later in the disc drive 1B of the second embodiment, in the same manner as was described above for the disc drive 1A of the first embodiment, because there is virtually no restriction on the mounting position of the photo-interrupter above the disc, it is possible to mount the photo-interrupter easily without taking any consideration to the structure around the mounting position of the photo-interrupter. Further, because the photo-interrupter is provided on the opposite side of the clamped disc relative to the optical pick-up, it is possible to later provide a photo-interrupter without having to change the layout around the optical pick-up, spindle motor, turntable and the like.

Moreover, so long as the photo-interrupter is positioned above the disc, the mounting position of the photo-interrupter is not limited to the mounting positions described in the embodiments above.

Further, even though a photo CD was described in the embodiments above, the present invention is not limited to such optical discs, and this application can be applied to other optical discs so long as they include a bar code.

Furthermore, even though the above embodiments were described for the case in which a bar code was used as the identification indication, the present invention is not limited thereto, and it is possible to use other identification indication, such as two-dimensional data symbols, with the bar code reader described above being replaced by other reading means suited for reading such identification indication.

Finally, it is to be understood that many changes and additions may be made to the embodiments described above without departing from the scope and spirit of the invention as defined in the appended Claims.

What is claimed is:

1. A disc drive comprising:
   an optical pick-up for reading data recorded in a program area of an optical disc;
   a turntable;
   a disc clamber for holding the optical disc between the disc clamper and the turntable;
   a support means for supporting the disc clamper, said support means being provided on the opposite side of the optical disc relative to the optical pick-up when the optical disc is loaded in the disc drive; and
   identification indication reading means for reading out information of identification indication provided on at least a part of an annular identification indication area provided on the optical disc between a clamping area of the optical disc and the program area thereof, said identification indication reading means being provided on the support means so as to be arranged at a position corresponding to the identification indication area of the optical disc when the optical disc is loaded in the disc drive.

2. The disc drive as claimed in claim 1, wherein the optical disc has a top surface and an underside surface, and the identification indication is provided on the optical disc so as to be optically readable from either side of the top and underside surfaces thereof.

3. The disc drive as claimed in claim 1, wherein the identification indication provided on the optical disc is comprised of transparent portions and light-reflecting portions.

4. The disc drive as claimed in claim 1, wherein the identification indication includes a bar code.

5. The disc drive as claimed in claim 4, wherein the bar code is arranged in an arc shape and extends over a prescribed angle within a part of the identification indication area.

6. The disc drive as claimed in claim 1, wherein the identification indication reading means includes a photo-interrupter.

7. A disc drive comprising:
   an optical pick-up for reading data recorded in a program area of an optical disc having a top surface and an underside surface;
   a turntable:
   a disc clamper for holding the optical disc between the disc clamper and the turntable;
   a support means for supporting the disc clamper, said support means being arranged on the opposite side of the optical disc relative to the optical pick-up when the optical disc is loaded in the disc drive; and
   a photo-interrupter for optically reading out bar information of a bar code which is arranged in an arc shape within at least a part of an annular bar code area provided on the optical disc between the program area and a clamping area of the optical disk so as to be readable from either side of the top and underside surfaces of the optical disk, said photo-interrupter being provided on the support means.

8. The disc drive as claimed in claim 7, wherein the bar code provided on the optical disc are comprised of transparent portions and light-reflecting portions.

9. A disc drive comprising:
   an optical pick-up for reading data recorded in a program area of an optical disc;
   a casing which includes a top plate having an underside surface for covering at least an upper portion of the disc drive, the underside surface of said top plate of said casing being arranged at an opposite side of the optical disc relative to the optical pick-up when the optical disc is loaded in the disc drive; and
   identification indication reading means for reading out information of identification indication provided on at least a part of an annular identification indication area provided on the optical disc between a clamping area of the optical disc and a program area thereof, said identification indication reading means being provided on the underside surface of the top plate of the casing so as to be arranged at a position corresponding to the identification indication area of the optical disc when the optical disc is loaded in the disc drive.

10. The disc drive as claimed in claim 9 wherein the optical disc has a top surface and an underside surface and the identification indication is provided on the optical disc so as to be optically readable from either side of the top and underside surfaces thereof.

11. The disc drive as claimed in claim 9 wherein the identification indication provided on the optical disc is comprised of transparent portions and light-reflecting portions.

12. The disc drive as claimed in claim 9 wherein the identification indication includes a bar code.

13. The disc drive as claimed in claim 12 wherein the bar code is arranged in an arc shape and extends over a prescribed angle within a part of the identification indication area.

14. The disc drive as claimed in claim 9 wherein the identification indication reading means includes a photo-interrupter.

15. A disc drive comprising:

an optical pick-up for reading data recorded in a program area of an optical disc having a top surface and an underside surface;

a casing which includes a top plate having an underside surface for covering at least the upper portion of the disc drive, the underside surface of said top plate of said casing being arranged at the opposite side of the optical disc relative to the optical pick-up when the optical disc is loaded in the disc drive; and a photo-interrupter for optically reading out bar information of a bar code which is arranged in an arc shape within at least a part of an annular bar code provided on the optical disc between the program area and a clamping area of the optical disc so as to be readable from either side of the top and underside surfaces of the optical disc, said photo-interrupter provided on the underside surface of the top plate of the casing.

16. The disc drive as claimed in claim 15 wherein the bar code provided on the optical disc is comprised of transparent portions and light-reflecting portions.

* * * * *